United States Patent [19]

Ishikawa et al.

[11] Patent Number: 4,739,673
[45] Date of Patent: Apr. 26, 1988

[54] ELECTRICALLY OPERATED TILTABLE VEHICLE STEERING MECHANISM

[75] Inventors: Masanobu Ishikawa, Nagoya; Kazunori Sakamoto, Toyoake; Yuji Yokoya; Sumio Takizawa, both of Toyota, all of Japan

[73] Assignees: Aisin Seiki Kabushiki Kaisha; Toyota Jidosha Kabushiki Kaisha, both of Tokyo, Japan

[21] Appl. No.: 909,038

[22] Filed: Sep. 19, 1986

[30] Foreign Application Priority Data

Sep. 20, 1985 [JP] Japan ................... 60-209616
Sep. 20, 1985 [JP] Japan ................... 60-209617

[51] Int. Cl.$^4$ .................. B62D 1/18; F16H 25/24; F16D 7/02
[52] U.S. Cl. .................... 74/493; 74/89.15; 74/411; 74/424.8 R; 192/141; 192/149; 280/775; 464/46
[58] Field of Search ............... 74/89.15, 424.8 R, 411, 74/493; 280/775; 192/141, 143, 149; 464/46

[56] References Cited

U.S. PATENT DOCUMENTS

| | | | |
|---|---|---|---|
| 1,590,570 | 6/1926 | Flack et al. | 74/89.15 |
| 1,966,246 | 7/1934 | Jackson | 74/411 |
| 2,640,694 | 6/1953 | Jackson | 74/89.15 |
| 3,105,371 | 10/1963 | Forrest | 74/411 |
| 3,203,268 | 8/1965 | Manoni et al. | 74/411 |
| 3,252,350 | 5/1966 | Zeigler | 74/493 |
| 4,114,747 | 9/1978 | Eller | 192/143 |
| 4,503,504 | 3/1985 | Suzumura et al. | 74/493 |
| 4,612,822 | 9/1986 | Nishikawa et al. | 280/775 |
| 4,633,732 | 1/1987 | Nishikawa et al. | 74/493 |
| 4,669,325 | 6/1987 | Nishikawa et al. | 74/89.15 |

FOREIGN PATENT DOCUMENTS

| | | | |
|---|---|---|---|
| 59-89266 | 5/1984 | Japan | 74/493 |
| 59-193771 | 12/1984 | Japan . | |
| 59-230861 | 12/1984 | Japan . | |
| 59-231259 | 12/1984 | Japan . | |
| 2113629 | 8/1983 | United Kingdom | 74/493 |

Primary Examiner—Allan D. Herrmann
Attorney, Agent, or Firm—Finnegan, Henderson, Farabow, Garrett & Dunner

[57] ABSTRACT

An electrically operated tiltable vehicle steering mechanism includes an electric motor of a reversible type which is adapted to drive through a speed reduction mechanism a screw shaft of a screw-nut mechanism. The screw-nut mechanism includes a nut which is engaged with the screw shaft and connected with a tiltable bracket supporting a steering shaft. Stoppers are provided to limit the stroke of the movement of the nut. The stopper includes a stopper plate made of a metallic material of a low frictional coefficient and a rubber cushion. The stopper is located with the stopper plate faced to the nut for engagement therewith and the rubber cushion maintained in contact with the housing of the screw-nut mechanism. The mechanism is provided with a clutch means for allowing a slip between the motor and the screw nut mechanism when the excessive load is applied to a torque transmission mechanism.

12 Claims, 5 Drawing Sheets

FIG. 3

ELECTRICALLY OPERATED TILTABLE VEHICLE STEERING MECHANISM

BACKGROUND OF THE INVENTION

1. Field of the Invention

The present invention relates to a tiltable vehicle steering mechanism, and more particularly to an electrically operated tiltable vehicle steering mechanism. More specifically, the present invention pertains to a vehicle steering mechanism wherein a rotation of an electric motor is converted into a linear motion by means of a screw-nut mechanism, the linear motion being transferred through a linkage to a tiltable bracket which supports a steering shaft to thereby produce a tilting motion of the tiltable bracket and the steering shaft.

2. Description of the Prior Art

An example of an electrically operated tiltable vehicle steering mechanism is disclosed by the Japanese patent Application (Publication) No. 59-230861 in which a stopper device is provided in the screw-nut mechanism to limit the stroke of the screw shaft. According to the proposal by the Japanese patent application, the screw-nut mechanism includes a nut engaged with a screw shaft so that the nut is moved in the axial direction upon a rotation of the screw shaft. The nut is provided at the opposite axial ends with stopper shoes which are adapted to be brought into abutting engagement with stopper plates provided on the housing of the screw-nut mechanism.

In the proposed mechanism, the stopper shoes are formed by rubber or similar resilient material which are of relatively large frictional coefficient so that the shoes do not slip or slidably move with respect to the stopper plate when the shoes are brought into abutting engagement with the stopper plates. It should however be pointed out that such slipless engagement between the stopper shoes and the stopper plate is disadvantageous in view of the life of the stopper device, because the nut is applied with a certain amount of rotative force by the screw shaft and the stopper shoes are deformed not only in the axial direction but also in the circumferential direction when they engage the stopper plates.

Further, in said Japanese patent disclosure the screw-nut mechanism will be subjected to damage when the steering shaft is moved to an extreme position over its predetermined stroke or an excessive load is applied to the steering shaft.

SUMMARY OF THE INVENTION

It is therefore an object of the present invention to provide an electrically operated tiltable vehicle steering mechanism having stopper mechanism of an increased durability.

Another object of the present invention is to provide a tiltable vehicle steering mechanism having a speed reduction mechanism being provided with a clutch mechanism for allowing a slip between the electric motor and the screw nut mechanism when an excessive load occurs in a torque transmission mechanism.

According to the present invention, the above and other objects can be accomplished by an electrically operated tiltable vehicle steering mechanism including electric motor means having output shaft means, screw-nut means having screw shaft means supported for rotation but restricted from axial movements and nut means threadably engaged with said screw shaft means and supported against rotation, drive means between the output shaft means of the motor means and said screw shaft means of the screw-nut means to transmit a driving torque from said output shaft means of the motor means to the screw shaft means, tiltable bracket means mounted on a stationary part of a vehicle and supporting steering shaft means, means for concerning said nut means with said tiltable bracket means so that the tiltable bracket means is tiltably moved upon an axial movement of the nut means, stopper means provided in said screw-nut means for limiting stroke of the axial movement of the nut means, said stopper means including metallic stopper plate means located for engagement with an axial end of the nut means, said stopper plate means being carried by a stationary part of the screw-nut means through resilient means so that the stopper plate means is axially movable within the resiliency of the resilient means but constrained from rotation According to the feature of the present invention there is provided an electrically operated tiltable vehicle mechanism including electric motor means having output shaft means, screw-nut means having screw shaft means supported for rotation but restricted from axial movements and nut means threadably engaged with said screw shaft means and supported against rotation, drive means between the output shaft means of the motor means and said screw shaft means of the screw-nut means to transmit a driving torque from said output shaft means of the motor means to the screw shaft means, tiltable bracket means mounted on a stationary part of a vehicle and supporting steering shaft means, means for connecting said nut means said tiltable bracket means so that the tiltable bracket means is tiltably moved upon an axial movement of the nut means, stopper means provided in said screw-nut means for limiting stroke of the axial movement of the nut means, said drive means including clutch means which restrict a torque being transmitted from said output shaft means of the motor means to the screw shaft means below a predetermined value.

The above and other objects and features of the present invention will become apparent from the following descriptions of a preferred embodiment taking reference to the accompanying drawings, which drawings are incorporated in and constitute a part of this specification.

BRIEF DESCRIPTION OF THE DRAWINGS

FIG. 3 is a sectional view taken along the line III-—III in FIG. 1;

DESCRIPTION OF THE PREFERRED EMBODIMENT

Figure 1:
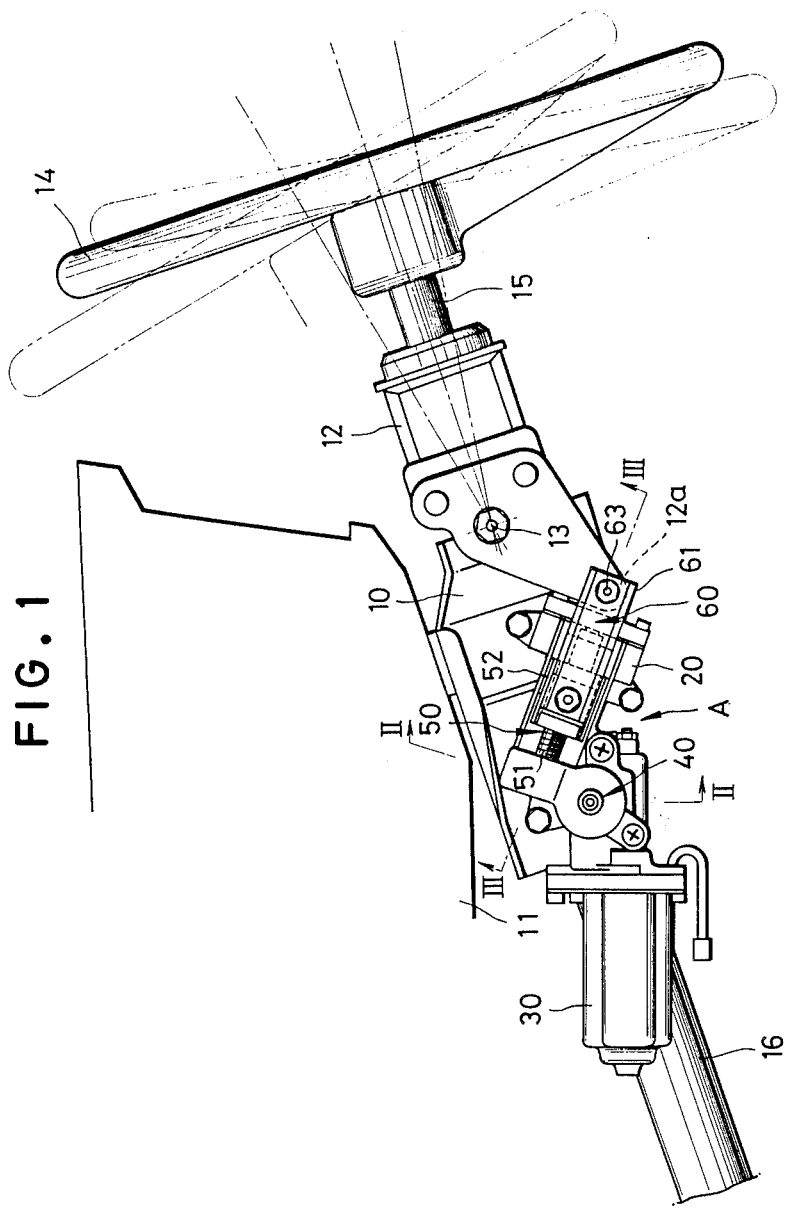
FIG. 1 is a side view of an electrically operated tiltable steering mechanism in accordance with one embodiment of the present invention.

Referring to the drawings, particularly to FIG. 1, there is shown an electrically operated steering mechanism including a stationary or break-away bracket 10 which is mounted on a lower portion of a dash-board 11 which is a part of the vehicle body. The body 10 caries at an upper portion a tiltable bracket 12 which is mounted on the stationary bracket 10 bymeans of a pin 13 for tiltable movement. A driving mechanism A is provided for tiltably moving the bracket 12. Further, the tiltable bracket 12 supports a steering shaft 15 for rotation about its own axis. A steering wheel 14 is provided on the upper end of the steering shaft 15. Although not shown in the drawings, the steering shaft 15 is connected through a universal joint (not shown) with a steering main shaft (not shown) which is inserted into a steering column 16.

As shown, the driving mechanism A includes a housing 20 which is secured by means of bolts to one side of the stationary bracket 10, an electric motor 30 mounted on the housing 20, a speed reduction mechanism 40, a screw-nut mechanism 50 and a linkage 60 provided between the screw-nut mechanism 50 and the tiltable bracket 12. The electric motor is of a reversible type which is operated through an actuation of an electric switch.

Figure 2:
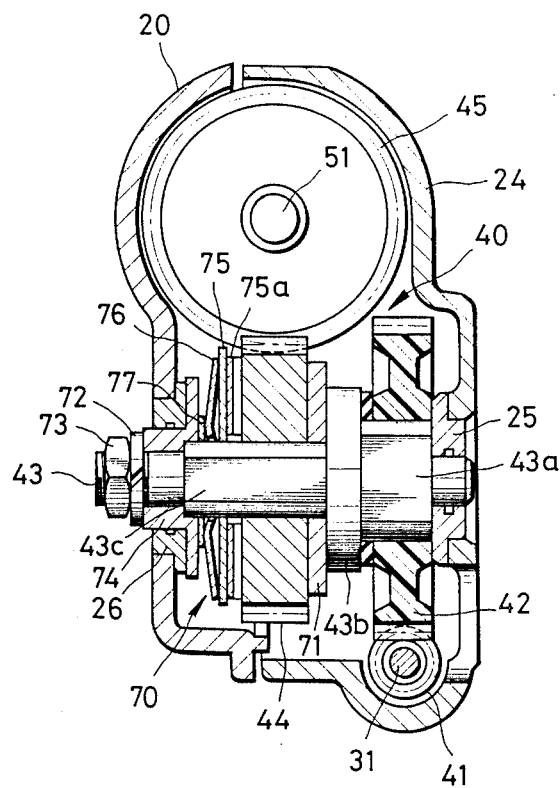
FIG. 2 is a sectional view taken along the line II—II in FIG. 1.

The motor 30 has an output shaft 31 which is connected with a worm 41 as shown in FIG. 2. The speed reduction mechanism 40 functions to reduce the rotating speed of the output shaft 31 of the motor 30 to thereby amplify the driving torque. Thus, the speed reduction mechanism 40 includes a worm wheel 42 engaged with the worm 41 and carried by a shaft 43 at a connection 43a for rotation with the shaft 43 as a unit. The shaft 43 rotatably carries a toothed gear 44 which is in meshing engagement with a gear 45.

Figure 3:
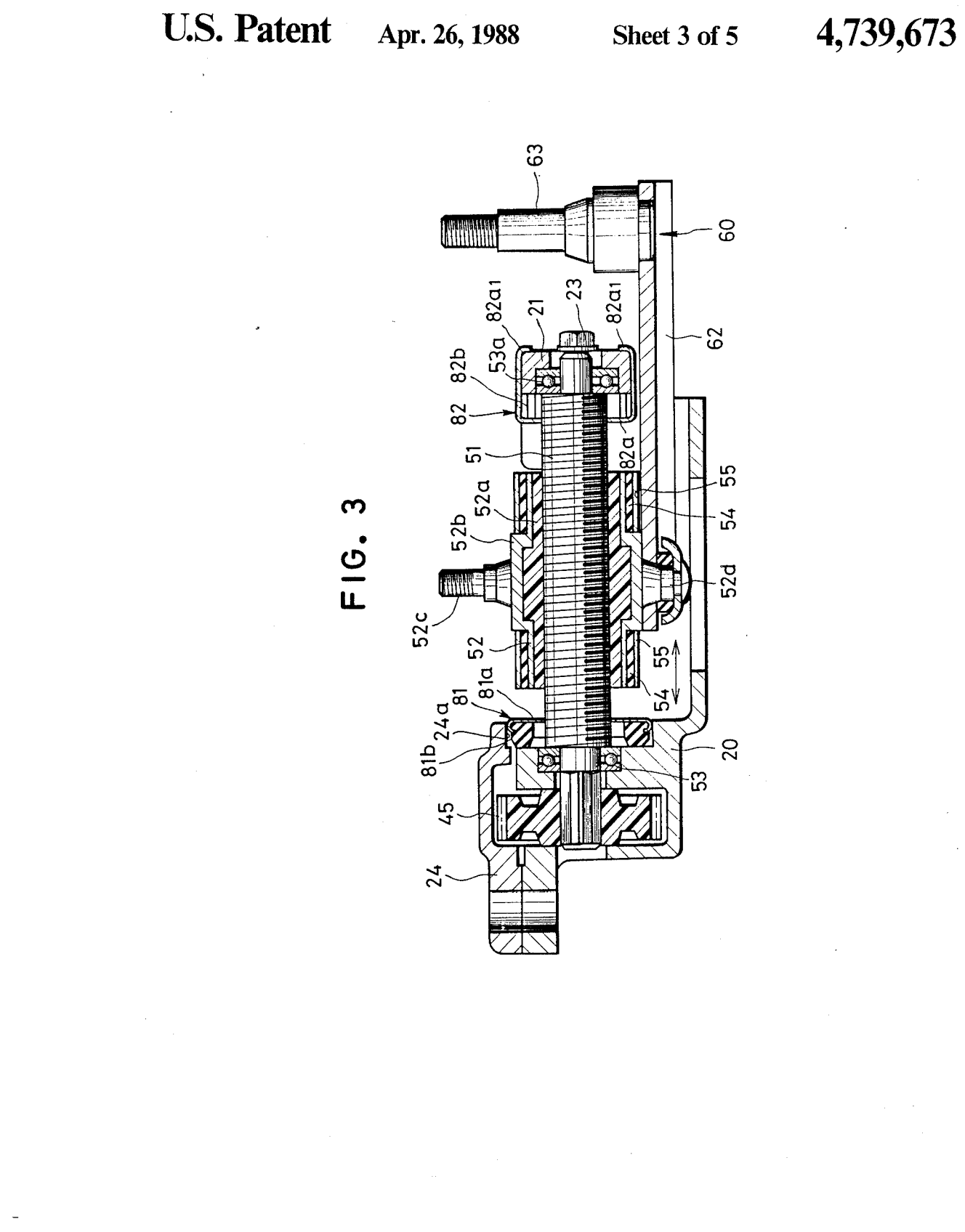
Figure 4:
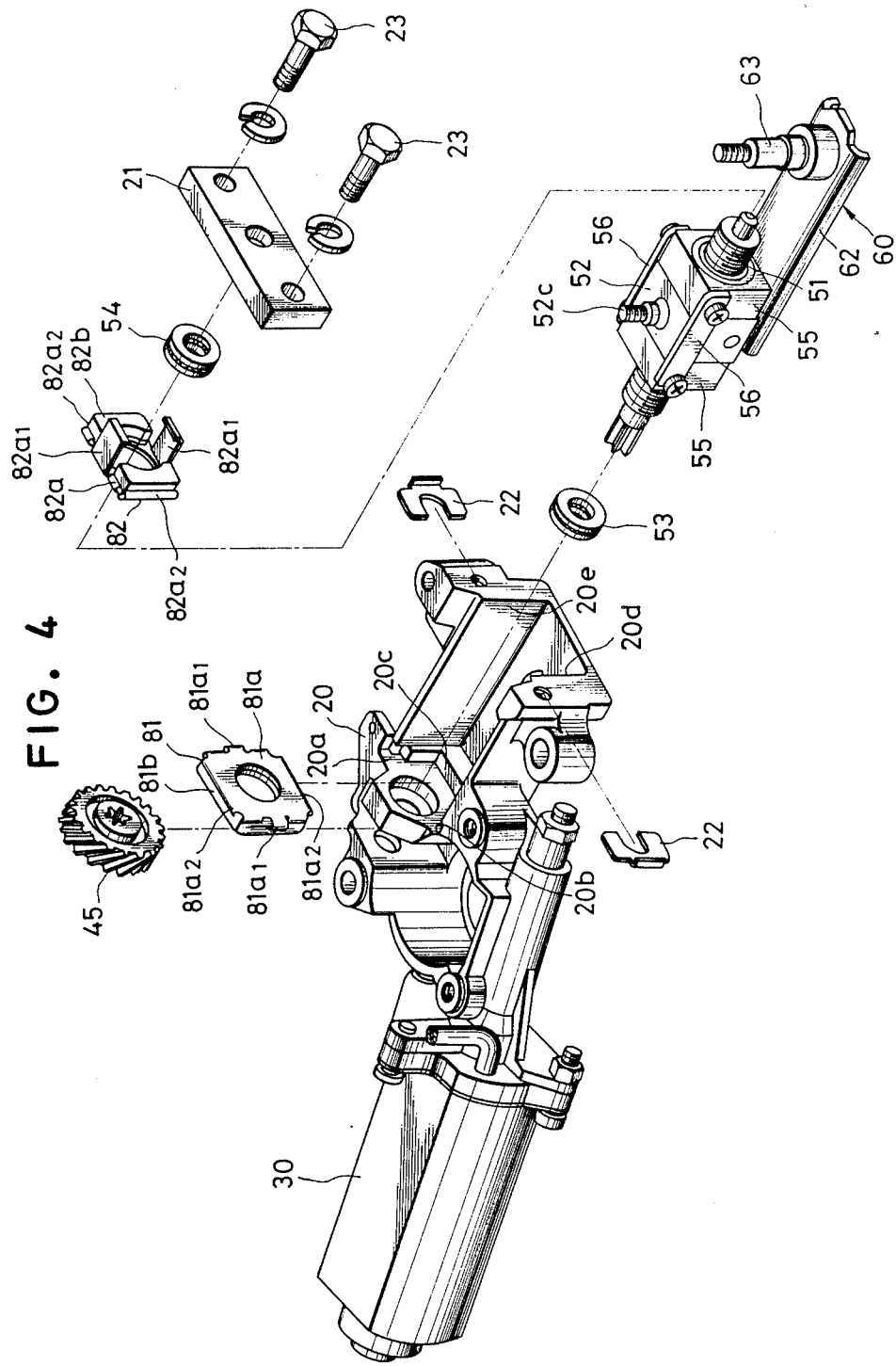
FIG. 4 is an exploded perspective view of the driving mechanism employed in the steering mechanism shown in FIG. 1; and, FIG. 5 is an exploded perspective view of the clutch mechanism shown in FIG. 2.

The screw-nut mechanism 50 includes a screw shaft 51 and a nut 52 engaged with the screw shaft 51. The gear 45 in the speed reduction mechanism 40 is mounted on the screw shaft 51 to rotate therewith. The screw shaft 51 is also mounted at one end on the housing 20 by means of a thrust bearing 53. The other end of the screw shaft 51 is supported by a thrust bearing 53a on a support plate 21 which is secured to the housing 20 by means of bolts 23 through a shim 22. Thus, the screw shaft 51 is rotatable about its own axis but constrained from axial movement as shown in FIGS. 3 and 4. The nut 52 is comprised of a body 52a made of a plastic material and a metallic cover 52b covering the body 52a. The nut 52 has an axially extending slit (not shown) at one side and rubber rings 54 and metallic bands 55 are provided around the nut 52 to radially clamp the nut 52. Thus, the nut 52 is engaged with the screw shaft 51 without play. The bands 55 are connected together by means of connecting bands 56 as shown in FIG. 4.

The linkage 60 includes link levers 61 and 62 which are connected together by a pin 63 at one end. The link lever 62 is connected at the other end with one side of the nut 52 by means of a pin 52d. In the same manner, the link lever 61 is connected with the opposite side of the nut 52 by means of a pin 52c which is shown in FIG. 3.

Figure 5:
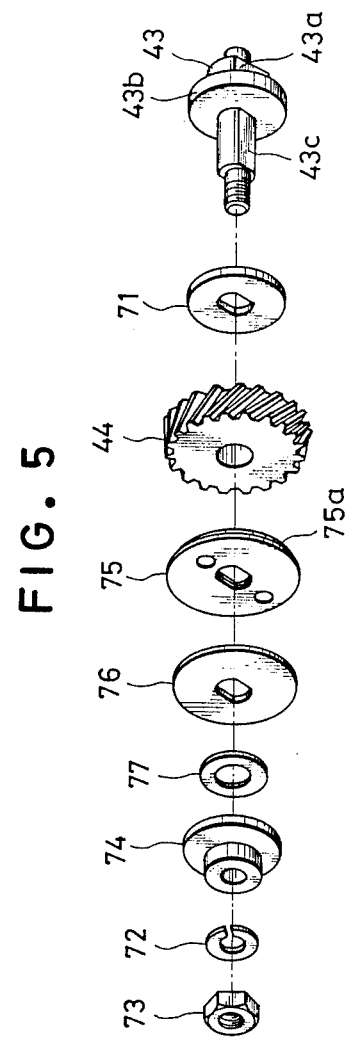

Referring to FIG. 2, it will be noted that the speed reduction mechanism 40 includes a clutch mechanism 70 which functions to connect the shaft 43 with the gear 44, but which allows a relative rotation between the shaft 43 and the gear 44 when the torque transmitted from the shaft 43 to the gear 44 exceeds a predetermined value. As shown in FIGS. 2 and 5, the clutch mechanism 70 includes a sliding plate 71 mounted on the shaft 43 at a side of a flange 43b through a flattened portion 43c on the shaft 43 to rotate together with the shaft 43.

The sliding plate 71 is located between the flange 43b on the shaft 43 and the gear 44. At the side of the gear 44 opposite to the sliding plate 71, there is a friction plate 75 which is also engaged with the flattened portion 43c of the shaft 43. A disc spring 76 and a shim 77 are provided in this order at the side of the friction plate 75 opposite to the gear 44. A collar 74 engages the shim 77 and the spring 76 and is retained by a nut 73 which engages the shaft 43. A spring washer 72 is provided between the collar 74 and the nut 73.

The friction plate 75 is provided at the side adjacent to the gear 44 with a lining 75a which is adapted to be engaged with the gear 44. The disc spring 76 forces the friction plate 75 into friction engagement with the gear 44. The biasing force of the spring 76 is adjusted by changing the thickness of the shim 77 so that a relative rotation is produced between the gear 44 and the sliding plate 71 and the friction plate 75 when the torque transmitted from the shaft 43 to the gear 44 exceeds a predetermined value. The shaft 43 is supported at one end on a cover 24 which is secured to the housing 20. A bush 25 journals the shaft 43. The other end of the shaft 43 is supported through the collar 74 and a bush 26 on the housing 20.

Referring further to FIGS. 3 and 4, it will be noted that a stopper 81 is provided at one end portion of the screw shaft 51 for restricting the stroke of the leftward movement of the nut 52. A second stopper 82 is provided adjacent to the other end portion of the screw shaft 51 for limiting the rightward stroke of the nut 52. The stopper 81 includes a metallic plate 81a and a rubber cushion 81b attached to the plate 81a. The stopper 81 is mounted on the housing 20 with the plate 81a located adjacent to the nut 52 with respect to the rubber cushion 81b. The plate 81a1 is formed at the opposite sides with arms 81a1 having curled free ends. The plate 81 is further formed at the opposite sides other than the sides where the arms 81a1 are formed with flanges 81a2 having curled free edges. The housing 20 has a pair of opposing grooves 20a and 20b which receive the arms 81a1 with a certain play. The housing 20 is further formed with a groove 20c which receives one of the flanges 81a2 with a certain play. The cover 24 has a surface 24a which defines a space for receiving the other of the flanges 81a2. The rubber cushion 81b is held in contact with the housing 20. Accordingly, the stopper plate 81a is held against rotation, but a certain axial displacement of the plate 81a is allowed.

The stopper 82 includes a plate 82a made of a metallic material and a rubber cushion 82b attached to the plate 82a. The stopper 82 is located with the plate 82a facing the nut 52 and held with the rubber cushion 82b in contact with the support plate 21. The plate 82a is formed at the opposite side edges with a pair of arms 82a1 and at the sides other than the sides where the arms 82a1 are formed with a pair of flanges 82a2. The stopper 82 is mounted in position with the arms 82a1 hooked to the plate 21 and the flanges guided by guide surfaces 20d and 20e in the housing 20. Thus, the stopper 82 is held against rotation but a certain axial movement of the metallic plate 82a is allowed.

With the structure described above, when the motor 30 is operated by actuating the switch, a rotation is transmitted from the output shaft 31 through the speed reduction mechanism 40 to the screw shaft 51. Thus, the screw shaft 51 is rotated in the one direction and the nut 52 is axially moved in one direction to pivot the tiltable bracket 12 about the pin 13. This will cause a tilting movement of the steering shaft 13 as shown by phantom lines in FIG. 1.

In the structure being described, the speed reduction mechanism 40 has the aforementioned clutch mechanism 70 so that when the steering shaft 15 or the steering wheel 14 is subjected to an excessive load or the steering shaft is moved to an extreme position of its stroke, the sliding plate 71 and the friction plate 75 are allowed to slip with respect to the gear 44. Thus, it is possible to maintain the torque being transmitted from the shaft 43 to the gear 44 below a prdetermined value. The mechanism described above is therefore effective to prevent the motor 30, the speed reduction mechanism 40, the screw-nut mechanism 50, the linkage 60 and the tiltable bracket 12 from excessive loads. As a result, the components of the steering mechanism can be made small and light in weight. The mechanism can further provide an advantage in that the worm 41 is engaged at different positions when the steering shaft is moved to its extreme stroke position because there is a certain amount of slippage in the clutch mechanism 70 when the steering shaft is moved to the extreme position of the stroke. It should further be noted that the clutch mechanism 70 is constituted by members which are totally housed between the flange 43b and the collar 74 so that any dimensional errors in the clutch components do not affect the assembly in the other parts. It is therefore possible to preliminarily assemble the clutch mechanism 70 with the worm wheel 42 and mount the assembly on the other part of the speed reduction mechanism.

At an extreme end of the stroke of the nut 52, one of the axial ends of the nut 52 is brought into an abutting engagement with one of the metallic plates 81a and 82a in the stoppers 81 and 82. The axial force applied from the nut 52 to the plate 81a or 82a upon abutting engagement of the nut with the plate 81a or 82a is absorbed by the rubber cushion 81b or 82b and the movement of the nut 52 is restricted by the stopper 81 or 82. Any rotative or torsional force which may be applied from the nut 52 to the plate in the stopper causes a slippage between the nut 52 and the plate 81a or 82a because the plate is made of a metallic material having a low friction coefficient. Thus, the torsional force is signficantly decreased before it is transmitted to the plate 81a or 82a. Further, any remaining torsional force which may be transmitted to the plate 81a or 82a is born by the housing 20 or the support plate 21 due to the engagement between the plate 81a or 82a and the housing 20 or the support plate 21. It is therefore possible to prevent the torsional force from being transmitted from the nut 52 to the rubber cushion 81b or 82b. The arrangement is therefore effective to increase the life of the rubber cushion.

The invention has thus been shown and described with reference to a specific embodiment, however, it should be noted that the invention is in no way limited to the details of the illustrated structures but changes and modifications may be made without departing from the scope of the appended claims.

What is claimed is:

1. An electrically operated tiltable vehicle steering mechanism, comprising:
   housing means having first and second opposing walls means;
   screw-nut means including screw shaft means supported for rotation at opposite ends thereof by said first and second opposing wall means and nut means threadedly engaged with said screw shaft means for axial movement therealong and supported for restricting rotational movement;
   electric motor means having output shaft means;
   drive means for drivingly connecting said output shaft means of said motor means and said screw-nut means;
   tiltable bracket means adapted for fixedly supporting a steering shaft means;
   connecting means connecting said nut means and said tiltable bracket means for converting said axial movement of said nut means to said tilting movement of said tiltable bracket means;
   stopper means disposed between axial ends of said nut means and each of said first and second opposing wall means of said housing means for limiting the axial movement of said nut means, said stopper means including;
      first stopper plate means positioned for engagement with an axial end of said nut means and first resilient means positioned between said first stopper plate means and said first opposing wall means for providing limited axial movement of said first stopper plate means toward said first opposing wall means; and
      second stoper plate means positioned for engagement with another axial end of said nut means and second resilient means positioned between said second stopper plate means and said second opposing wall means for providing limited axial movement of said second stopper plate means toward said second opposing wall means; and
   means for guiding said first and second stopper plate means for permitting limited axial movement of said first and second stopper plate means within said housing means and for restricting rotational movement of said first and second stopper plate means.

2. The mechanism of claim 1, wherein said first and second stopper plate means are made of a metallic material having a low coefficient of friction for permitting slippage between said nut means and said first and second stopper plate means when said nut means engages said first and second stopper plate means.

3. The mechanism of claim 1, wherein said guiding means includes first guide means for guiding said first stopper plate means and second guide means for guiding said second stopper plate means, said first guide means including groove means disposed in said housing means for guidably receiving said first stopper plate means, said second guide means including extension means extending from said second stopper plate means for slidably engaging said second opposing wall means.

4. The mechanism of claim 3, wherein said second opposing wall means includes plate means separable from said housing means for facilitating assembly of said screw-nut means within said housing means, said second opposing wall means including fastening means for fastening said plate means to said housing means.

5. The mechanism of claim 4, wherein said drive means includes clutch means for maintaining the transmission of torque from said output shaft means to said screw shaft means below a predetermined value.

6. The mechanism of claim 5, wherein said drive means includes drive shaft means, said clutch means being disposed at an end portion of said drive shaft means.

7. The mechanism of claim 6 wherein said drive means includes worm means driven by said motor means;
worm wheel means drivingly connected to said worm means, and disposed for rotation with said drive shaft means; and
gear means rotatably supported on said drive shaft means, said gear means drivingly engaging said screw shaft means, wherein said clutch means is disposed between said drive shaft means and said gear means.

8. The mechanism of claim 7, wherein said clutch means is disposed on said drive shaft means of said drive means on a side of said gear means facing away from said worm wheel means.

9. An electrically operated tiltable vehicle steering mechanism, comprising:
housing means having first and second opposing wall means;
screw-nut means including screw shaft means supported for rotation at opposite ends thereof by said first and second opposing wall means and nut means threadedly engaged with said screw shaft means for axial movement therealong and supported for restricting rotational movement;
electric motor means having output shaft means;
drive means for drivingly connecting said output shaft means of said motor means and said screw-nut means;
tiltable bracket means adapted for fixedly supporting a steering shaft means;
connecting means for connecting said nut means and said tiltable bracket means for converting said axial movement of said nut means to said tilting movement of said tiltable bracket means;
stopper means disposed between axial ends of said nut means and each of said first and second opposing wall means of said housing means for limiting the axial movement of said nut means, said stopper means including;
first stopper plate means positioned for engagement with an axial end of said nut means and first resilient means positioned between said first stopper plate means and said first opposing wall means for providing limited axial movement of said first stopper plate means toward said first opposing wall means; and
second stopper plate means positioned for engagement with another axial end of said nut means and second resilient means positioned between said second stopper plate means and said second opposing wall means for providing limited axial movement of said second stopper plate means toward said second opposing wall means; and
means for guiding said first and second stopper plate means for providing limited axial movement of said stopper plate means within said housing means and for restricting rotational movement of said first and second stopper plate means;
said drive means including clutch means for maintaining the transmission of torque from said output shaft means to said screw shaft means below a predetermined value, and wherein said drive means includes drive shaft means, said clutch means being disposed at an end portion of said drive shaft means.

10. The mechanism of claim 9, wherein said first and second stopper plate means are made of a metallic material having a low coefficient of friction for permitting slippage between said nut means and said first and second stopper plate means when said nut means engages said stopper plate means.

11. The mechanism of claim 10 wherein said drive means includes
worm means driven by said motor means;
worm wheel means drivingly connected to said worm means, and disposed for rotation with said drive shaft means; and
gear means rotatably supported on said drive shaft means, said gear means drivingly engaging said screw shaft means, wherein said clutch means is disposed between said drive shaft means and said gear means.

12. The mechanism of claim 11, wherein said clutch means is disposed on said drive shaft means of said drive means on a side of said gear means facing away from said worm wheel means.

* * * * *